Feb. 15, 1949.  G. D. WILLITS  2,462,017
MOTOR AND BRAKE MECHANISM
Filed March 5, 1948  2 Sheets-Sheet 1
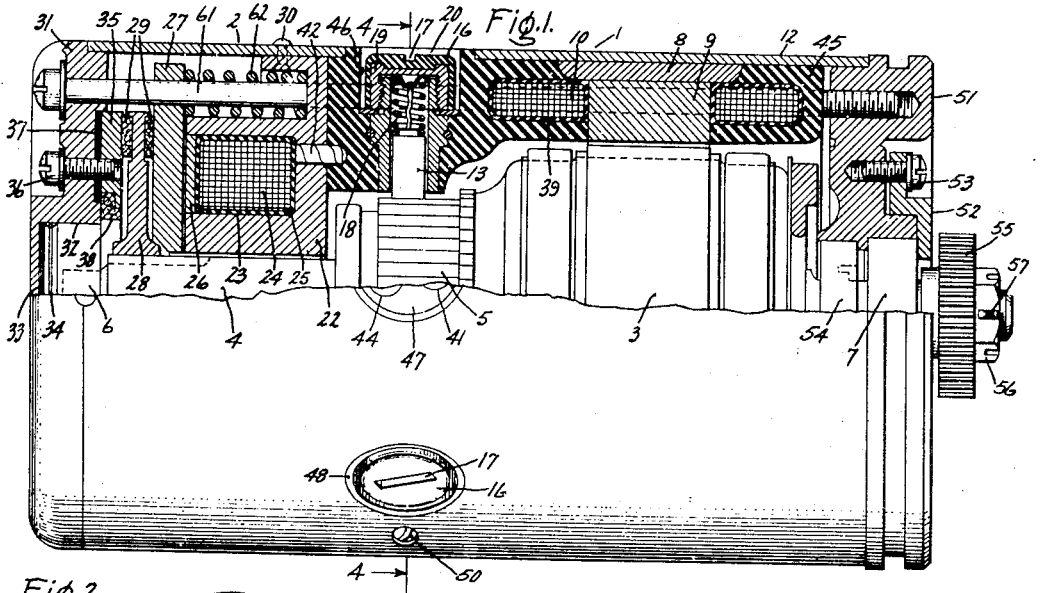
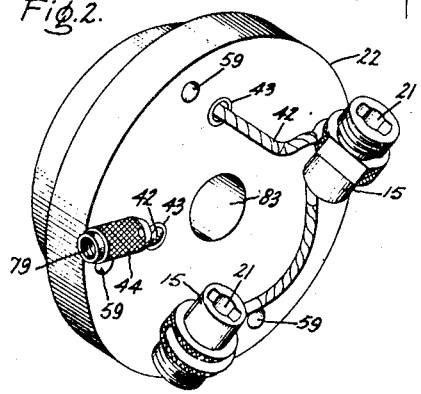
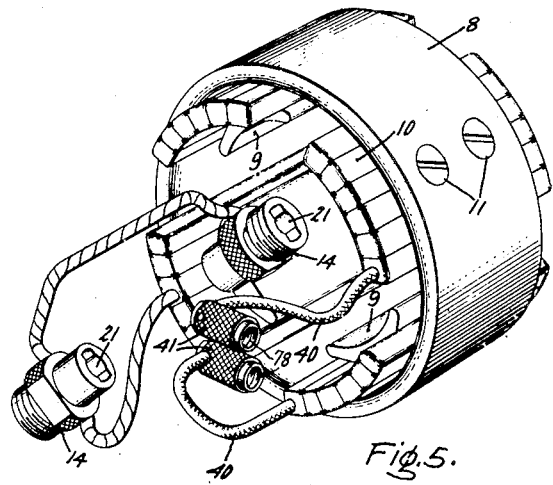
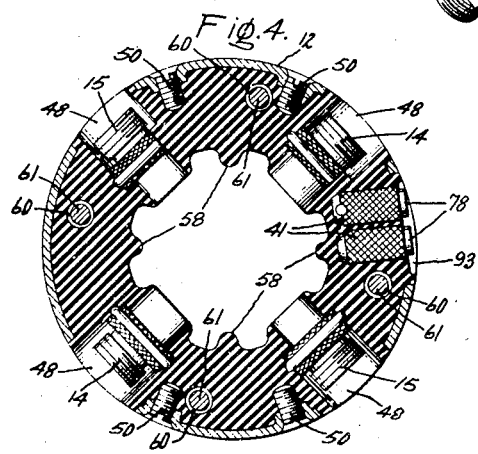
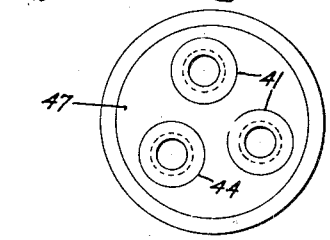
Inventor:
Glenn D. Willits,
by Cravell & Mack
His Attorney.

Feb. 15, 1949.　　　　　G. D. WILLITS　　　　　2,462,017
MOTOR AND BRAKE MECHANISM
Filed March 5, 1948　　　　　　　　　　　　　　　　2 Sheets-Sheet 2

Inventor:
Glenn D. Willits,
by Browell P. Mack
His Attorney.

Patented Feb. 15, 1949

2,462,017

UNITED STATES PATENT OFFICE 2,462,017

MOTOR AND BRAKE MECHANISM

Glenn D. Willits, Leo, Ind., assignor to General Electric Company, a corporation of New York Application March 5, 1948, Serial No. 13,124

12 Claims. (Cl. 172—36)

This invention relates to motor and brake mechanisms and more particularly to such a mechanism having its major components permanently bound together by molded insulating material to form a unitary structure.

In the design of dynamoelectric machines, particularly for use on aircraft, it is frequently necessary to provide a structure capable of withstanding prolonged severe vibration. Brake mechanisms are frequently associated with such dynamoelectric machines, for example, in a pitch changer for aircraft propellers, and it is desirable in the manufacture of such a combination to reduce the weight and size to a minimum while providing a mechanism which will withstand the severe vibration encountered.

An object of this invention is to provide an improved motor and brake mechanism.

Another object of this invention is to provide an improved motor and brake mechanism having the major components molded together to form a unitary structure.

A further object of this invention is to provide an improved motor and brake mechanism wherein the parts subject to vibration are encased in molded insulating material.

Further objects and advantages of this invention will become apparent and the invention will be better understood from the following description referring to the accompanying drawings, and the features of novelty which characterize this invention will be pointed out with particularity in the claims annexed to and forming a part of this specification.

A feature of this invention is the provision of an improved motor and brake mechanism wherein the motor stator and field coils, the brush holder tubes, terminals for connection to the external leads, brake housing, and internal leads are all bound together and encased in molded insulating material, thereby providing a structure of minimum size and weight, and preventing damage due to vibration.

Figure 6:
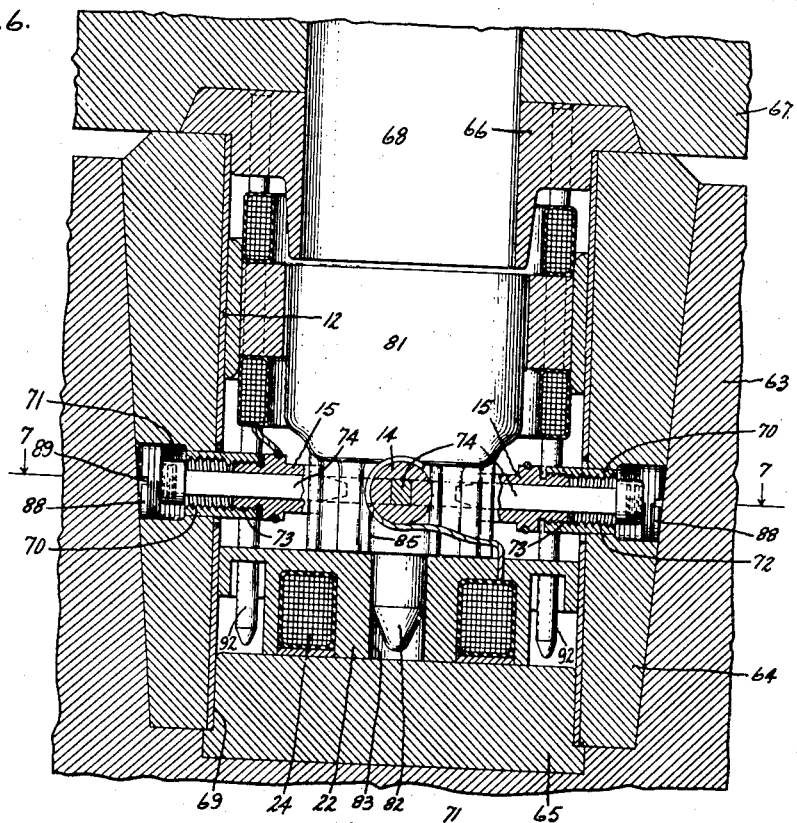
Figure 7:
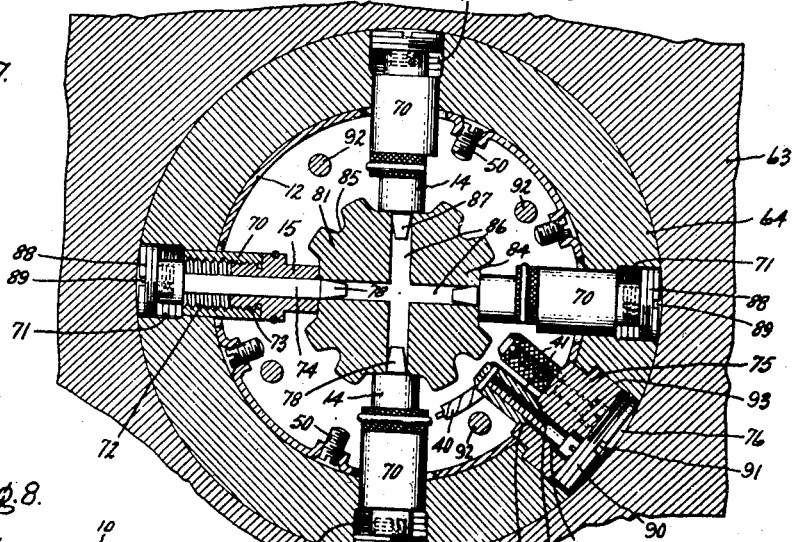
Figure 8:
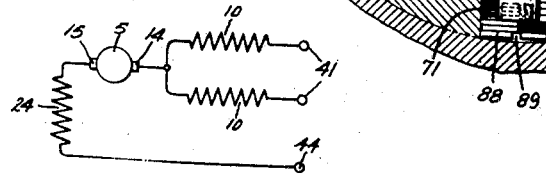

In the drawing, Fig. 1, is a side elevational view, partly in section, illustrating the improved motor and brake mechanism construction of this invention; Fig. 2 is a view in perspective of the brake coil housing member, two of the brush holder tubes, one terminal, and the brake coil leads prior to assembly and molding; Fig. 3 is a view in perspective of the motor stator assembly, the other two brush holder tubes and terminals, and the field coil leads, prior to assembly and molding; Fig. 4 is a cross sectional view of the mechanism of Fig. 1 taken along the line 4—4; Fig. 5 shows the exterior arrangement of the terminals; Fig. 6 is an elevational view, partly in section, of a portion of the mold for molding the mechanism of Fig. 1 showing the components to be molded positioned therein; Fig. 7 is a vertical cross section of the mold of Fig. 6 taken along the line 7—7; and Fig. 8 is a schematic circuit diagram of the mechanism.

Referring now to Fig. 1, there is shown the improved motor and brake mechanism of this invention in which the motor portion is designated generally as 1 and the brake portion as 2. The motor is provided with an armature 3 mounted on shaft 4 and having a commutator 5. The rotor assembly is rotatably supported by bearings 6 and 7, preferably of the anti-friction type, within the motor stator member. The stator comprises the cylindrical field yoke 8, pole shoes 9, and field coils 10, the pole shoes being secured to the yoke by any suitable means, such as screws 11. The stator assembly is tightly fitted within a cylindrical enclosing shell 12.

The commutator 5 is contacted by a plurality of brushes 13 positioned in brush holder tubes 14 and 15 formed of conductive material. The brush holder tubes are threaded at their outer extremities to receive brush caps 16, which may be slotted to a screw driver, as shown at 17. The brush caps are formed with an inner section 19 of conductive material which threadingly engages the brush holder tubes, and an outer section 20 of insulating material. The brushes are biased against the commutator by springs 18 seated in grooves 21 in the brush holder tubes.

The brake mechanism includes a brake coil housing member 22 having an annular cavity 23 formed in its face remote from the motor 1. An annular brake coil 24 is positioned in this cavity and insulated therefrom by insulation 25. A non-magnetic retainer washer 26 secures the brake coil in place and is anchored to the brake housing member by any suitable means, as by stacking. An annular brake armature member 27 surrounds shaft 4 and is adapted to be actuated by the brake coil 24. Brake disk 28 is secured to the shaft 4 by means of a slip fit spline and rotates therewith. The outer periphery of the brake disc is provided at either side with annular brake lining material 29. The brake coil housing assembly is also fitted tightly within the cylindrical shell 12 and is secured thereto by suitable means, such as rivets 30. The shell is closed at the brake end by an end shield 31 which supports the bearing 6 in a bearing recess 32. The bearing 6 is given the necessary axial bias by a shim and washer combination including a plurality of shim washers 33 and spring washers 34. An annular stationary brake plate 35 is secured to the end shield 31 by suitable means, such as screws 36 and is adjusted for the desired brake action by the use of shim washers 37. Felt washer 38 is mounted in a groove in the inner periphery of the stationary brake plate 36 and serves to absorb or prevent any oil or grease that may escape from the bearing 6 from coming in contact with the brake lining 29 thus greatly reducing the coefficient of friction.

The stator coils 10 are suitably insulated with insulating material 39 and their leads 40 are secured, as by brazing, to the brush holder tubes 14 and terminals 41. The leads 42 of the brake coil 24 are brought through holes 43 in the face of the brake coil housing member 22 and are also secured, as by brazing, to the brush holder tubes 15 and terminal 44. The terminals 41 and 44 serve to connect the external leads of the mechanism, as shown schematically in Fig. 8.

In their assembled relation, the stator and brake members are spaced apart and the brush holder tubes 14 and 15 and terminals 41 and 44 interposed therebetween. The brake coil housing member 22, brush holder tubes and terminals, and the stator 1 are bound together in a fixed relationship by a solid mass of a molded insulating material 45 which encases the stator coils 10 and the stator and brake coil leads 40 and 42, filling the voids in the shell 12 from the central bore of the pole shoes 9 outward. Recessed openings 46 are provided in the molded material 45 between the stator 1 and brake 2 to receive brush caps 16, thus permitting the mounting of the brush caps so that their exterior surface does not project beyond the outer surface of the mechanism. The outer edges of the terminals 41 and 44 are flush with the outer surface of the mechanism, as shown at 47 in Fig. 1 and in Fig. 5. The shell 12 is provided with four openings 48 and a single opening 49 for the brush holder caps 16 and terminals 41 and 44 respectively. Screws 50 in the shell 12 and molded material 45 are provided to produce threaded holes in the exterior of the completed mechanism for mounting purposes.

The cavity formed by the shell 12 is closed at the motor end by end shield 51 in which is seated the bearing 7. The bearing is held in position by a bearing retainer member 52 which is secured to the end shield 51 by any suitable means, such as screws 53. A shaft seal 54 is also seated within the end shield 51 and is positioned between the bearing 7 and the armature 3. Power is adapted to be taken from the shaft 4 by suitable means, such as gear 55 which is held in position on the end of the shaft by any suitable means, such as nut 56 and cotter pin 57.

Referring now to Fig. 4, it will be seen that ridges or barriers 58 are molded between the brush holder tubes 14 and 15. These serve to increase the leakage path between the brush holder tubes and brushes 13, thereby reducing the possibility of arc-over between the brushes.

Referring now to Fig. 8, it will be seen that the terminals 41 are connected to the two series field windings 10, which in turn are connected in series with the commutator 5 through brushes 13 and the brake coil 24, which in turn is connected to terminal 44. Thus, rotation of the motor in either direction and actuation of the brake is provided with only three external terminals.

Referring again to Fig. 1, a plurality of holes 59 are provided in the face of the brake coil housing member 22 and a plurality of mating holes 60 are formed in the molded material 45. A plurality of through bolts 61 are positioned in these holes and serve to secure the end shields 31 and 51 and, in addition, serve as guides for the brake armature member 27. The brake armature is biased against the action of the brake coil 24 by springs 62 which surround the through bolts 61, which also act as guides for the springs.

The method used to make the improved motor and brake mechanism of this invention will now be described. The four stator coils 10 are wound, formed, insulated with insulation 39, and approriately interconnected. The stator coil leads 40 are then connected, as by brazing, to the brush holder tubes 14 and the terminals 41. The pole shoes 9 are then inserted through the field coils 10 and securely anchored to the yoke member 8 by means of screws 11.

The brake coil housing member 22 is next turned from bar stock and the cavity 23 lined with insulation 25. The prewound brake coil 24 is then inserted in the cavity and the non-magnetic retainer washer 26 inserted and anchored to permanently hold the coil in place. The brake coil leads 42 are brought out through openings 43 in the brake coil housing member and are attached, as by brazing, to the brush holder tubes 15 and terminal 14. The assembled brake coil housing and coil are then pressed into the shell 12 and secured by rivets 31. The assembled stator yoke and coils are next pressed into the shell 12, the coils having been previously insulated with insulation 39. This insulation is applied to prevent damage to the coils in case the molding pressure distorts them or moves them against the shell 12 or yoke 8.

The stator, brake, brush holders and terminals are now ready for molding. Referring now to Figs. 6 and 7, there is shown a portion of a mold suitable for performing the molding operation, having an outer shoe portion 63 and an inner removable retainer pot or cavity portion 64. A bottom plug 65 closes the base of the cavity and an upper plug member 66 is positioned at the top of the cavity. A loading chamber member 67 is arranged over the upper plug member and a loading cavity 68 extends through both members into the cavity portion 64.

In preparing for the molding operation, the assembly described above comprising, the brake coil housing member 22 with its associated insulated brake coil 24, the brush holder tubes 14 and 15, the terminals 41 and 44, the leads 40 and 43, the yoke 8, the pole shoes 9, and the insulated field coils 10, all assembled as described above in shell 12, is positioned in the cavity portion 64 of the mold with the brake coil housing member 22 resting on the bottom plug 65. It will be noted that the bottom plug defines with the side wall of the cavity portion 64 a recess 69 in which the brake and extremity of the shell 12 is seated.

Brush holder tube bushings 70 are then inserted in the threaded side openings 71 in the cavity portion 64. These bushings are provided with an internal threaded portion 72 and another internal threaded portion 73 which is threaded in the opposite direction, the threaded portion 73 mating with the threaded extremities of brush holder tubes 14 and 15 and the threaded portion 72 being utilized to remove the bushing after molding. The bushings are then threaded onto the brush holder tubes and side pins 74 inserted. Terminal holding plug 75 is then inserted in threaded side opening 76 of the cavity portion 64. The terminal holding plug is provided with three countersunk through holes 77 into which are fitted the tip portions 78 of terminals 41 and 44. The terminals are provided with internal threaded portions 79 and are secured to the holding plug 75 by means of screws 80 seated in through holes 77.

A center plug member 81 is then inserted in the center of the mold. This plug member is provided with a tip 82 which seats in the central bore 83 of the brake coil housing member 22 and serves to position the plug. The center plug is profiled to provide the desired interior bore contour of the finished mechanism and includes a section 84 provided with a plurality of indentations 85 which produce the arc-over preventing ridges 58. The portion 85 of the plug member 81 is also provided with openings 86 into which the tips 87 of the side pins 74 are fitted. Hole plugs 88 are then screwed into the threaded side openings 71, a screw driver slot 89 being provided for this purpose. By this means, the brush holder tubes are pressed tightly against the center plug portion 84 and the side pins 74 positioned in the through holes 86, thus fixing the brush holder tubes 14 and 15 rigidly in assembled position for molding. Hole plug 90 is then screwed into threaded side opening 76, screw driver slot 91 being provided for this purpose. This firmly fixes the terminal holding plug 75 and the terminals 41 and 44 in place for molding.

The cavity portion 64 with the assembled mechanism components positioned and firmly affixed therein, is then inserted in the outer mold shoe portion 63. The upper plug 66 is then positioned over the cavity portion 64. This upper plug member is provided with a plurality of pins 92 secured thereto which provide the through holes 69 in the molded structure for through bolts 61. The loading chamber 67 is next positioned over the upper plug 66.

The next step is the actual molding operation. A molding compound is introduced into the mold cavity 64 by any of the several means now well known in the art. Thus, the compound may be introduced directly into the mold cavity and the total assembly molded under heat and pressure. Alternatively, the compound may be preheated and injected into the cavity by transfer molding techniques. In the case of the latter technique, the total assembly including the assembled components is subjected to heat and pressure to effect conversion of the compound to the infusible and insoluble state. In any event, the molding compound is forced under pressure into the cavity portion 64 to fill the voids inside the shell 12 and encasing the coils 10, pole shoes 9, brush holder tubes 14 and 15, terminals 41 and 44, and leads 40 and 42. As can be seen, the brake coil housing member 22 serves as the end of the mold while the shell 12 constitutes a substantial portion of the cylindrical surface of the mold.

While either a thermal-plastic or thermal-setting molding compound may be used, it has been found that a satisfactory compound is one having thermal-setting qualities, for instance, a compound having 41.5% hard rubber of high sulphur content, 12.5% cumarone-indine resin, 27% long fibre asbestos, and 18% phenol-formaldehyde resin. This material molds at a low pressure on the order of 800 lbs. per square inch and cures at a temperature on the order of 32° F. for 30 minutes.

The molding operation having been completed, the loading chamber 67 and upper plug 66 are removed and the cavity portion 64 removed, the hole plugs 88 and 90, side pins 74, brush holder bushings 70, screws 80, and terminal holding plug 75 are then removed. The center plug 81 is next removed leaving the integral molded motor and brake assembly ready for removal. It can be readily seen that the brush holder bushings 70 provide the recesses 46 in the finished mechanism, in which the brush caps 16 are positioned. In addition, the terminal holding plug 75 provides a recess 93 permitting the terminals 41 and 44 to be positioned below the exterior surface of the mechanism.

The mechanism is now ready for complete assembly which includes the insertion of the rotor member 3, assembly of the brake components, bearings, and end shields.

It can now be readily seen that the forgoing method provides an improved motor and brake mechanism characterized by its light and compact construction and freedom from damage due to vibration.

While there has been illustrated and described a specific embodiment of the invention, further embodiments will occur to those skilled in the art and it is intended in the appended claims to cover all modifications which do not depart from the spirit and scope of this invention.

What I claim as new and desire to secure by Letters Patent of the United States is:

1. A motor and brake mechanism comprising, a stator member for said motor including a core with coils, a plurality of brush holder members for said motor, a housing member for said brake, and insulating material binding all of said members together in a fixed relationship and encasing said core and coils whereby a unitary structure is provided.

2. A motor and brake mechanism comprising, a stator member for said motor including a core with coils, a plurality of brush holder members for said motor, a plurality of terminal members for connecting the external leads to said mechanism, a housing member for said brake, and insulating material binding all of said members together in a fixed relationship and encasing said core and coils whereby a unitary structure is provided.

3. A motor and brake mechanism comprising, a stator member for said motor including a core with coils, a plurality of brush holder members for said motor, a housing member for said brake having a brake actuating coil associated therewith, electrical conductors for connecting said brush holder members to said stator and brake coils, and a mass of molded insulating material binding all of said members together in a fixed relationship and encasing said core and stator coils and said electrical conductors whereby a unitary structure is provided.

4. A motor and brake mechanism comprising, a stator member for said motor including a core with coils, a plurality of brush holder members for said motor, a plurality of terminal members for connecting the external leads to said mechanism, a housing member for said brake having a brake actuating coil associated therewith, electrical conductors for connecting said brush holder members and said terminal members to said stator and brake coils, and a mass of molded insulating material binding all of said members together in a fixed relationship and encasing said core and stator coils and said electrical conductors whereby a unitary structure is provided.

5. A motor and brake mechanism comprising, a shell, a stator member for said motor including a core with coils and adapted to fit within said shell, a plurality of brush holder members for said motor, a plurality of terminal members for connecting the external leads to said mechanism, a housing member for said brake having a brake actuating coil associated therewith, electrical conductors for connecting said brush holder members and said terminal members to said stator and brake coils, and a mass of molded insulating material binding all of said members together in a fixed relationship and filling the voids in said shell whereby a unitary structure is provided, said core and stator coils and said electrical conductors being encased in said insulating material.

6. A motor and brake mechanism comprising, a stator member for said motor including a core with coils, a housing member for said brake spaced from said stator member and having a brake actuating coil associated therewith, a plurality of brush holder members for said motor positioned between said stator and brake housing members, electrical conductors for connecting said brush holder members to said stator and brake coils, and a mass of molded insulating material binding all of said members together in a fixed relationship and encasing said core and stator coils and said electrical conductors whereby a unitary structure is provided.

7. A motor and brake mechanism comprising, a stator member for said motor including a core with coils, a housing member for said brake spaced from said stator member and having a brake actuating coil associated therewith, a plurality of brush holder members for said motor positioned between said stator and brake housing members, a plurality of terminal members for connecting the external leads to said mechanism positioned between said stator and brake housing members, electrical conductors for connecting said brush holder members and said terminal members to said stator and brake coils, and a mass of molded insulating material binding all of said members together in a fixed relationship and encasing said core and stator coils and said electrical conductors whereby a unitary structure is provided.

8. A motor and brake mechanism comprising, a shell, a stator member for said motor including a yoke with a plurality of field poles extending inwardly defining a central bore and adapted to fit within said shell, a housing member for said brake spaced from said stator member and having a brake actuating coil associated therewith, a plurality of brush holder members for said motor positioned between said stator and brake housing members, a plurality of terminal members for connecting the external leads to said mechanism positioned between said stator and brake housing members, electrical conductors for connecting said brush holder members and said terminal members to said stator and brake coils, a mass of molded insulating material filling the space within said shell from the bore of said poles outwardly and binding all of said members together in a fixed relationship whereby a unitary structure is provided, and field coils positioned on said poles, said field coils and said electrical conductors being encased in said insulating material.

9. A motor and brake mechanism comprising, a stator member for said motor including a core with coils, a plurality of brush holder members for said motor adapted to receive contact brushes, a brake housing member for said brake having a brake actuating coil associated therewith, electrical conductors for connecting said brush holder members to said stator and brake coils, and a mass of molded insulating material binding all of said members together in a fixed relationship and encasing said core and stator coils and said electrical conductors whereby a unitary structure is provided, said molded insulating material forming barriers between said brush holder members whereby the creepage distance between said brushes is increased preventing arc-over therebetween.

10. A motor and brake mechanism comprising, a shell, a stator member for said motor including a yoke with a plurality of field poles extending inwardly defining a central bore and adapted to fit within said shell, a housing member for said brake spaced from said stator member and having a brake actuating coil associated therewith, a plurality of brush holder members for said motor positioned between said stator and brake housing members and adapted to receive contact brushes, a plurality of terminal members for connecting the external leads to said mechanism positioned between said stator and brake housing members, electrical conductors for connecting said brush holder members and said terminal members to said stator and brake coils, a mass of molded insulating material filling the space within said shell from the bore of said poles outwardly and binding all of said members together in a fixed relationship whereby a unitary structure is provided, and field coils positioned on said poles, said field coils and said electrical conductors being encased in said insulating material, said molded insulating material forming barriers between said brush holder members whereby the creepage distance between said brushes is increased preventing arc-over therebetween.

11. A motor and brake mechanism comprising, a stator member for said motor including a core with coils, a plurality of brush holder members for said motor, a plurality of terminal members for connecting the external leads to said mechanism, a housing member for said brake having a cavity formed therein, a brake actuating coil positioned in said cavity, electrical conductors connecting said brush holder and terminal members to said stator and brake coils, a brake armature adapted to be actuated by said brake coil, a plurality of fastening means extending through said stator and brake housing members, each of said means having one end adapted to secure an end shield to said stator member and having the other end adapted to serve as a guide for said brake armature, and a mass of molded insulating material binding all of said members together in a fixed relationship and encasing said core and stator coils and said electrical conductors whereby a unitary structure is provided.

12. A motor and brake mechanism comprising, a shell, a stator member for said motor including a yoke with a plurality of field poles extending inwardly defining a central bore and adapted to fit within said shell, a housing member for said brake spaced from said stator member and having a cavity formed therein, a brake actuating coil positioned in said cavity, a plurality of brush holder members for said motor positioned between said stator and brake housing members, a plurality of terminal members for connecting the external leads to said mechanism positioned between said stator and brake housing members, electrical conductors connecting said brush holder members and said terminal members to said stator and brake coils, a brake armature adapted to be actuated by said brake coil, a plurality of fastening means extending through said stator and brake housing members, each of said means having one end adapted to secure an end shield to said motor shell and the other end adapted to serve as a guide for said brake armature, a mass of molded insulating material filling the space within said shell from the bore of said poles outwardly and binding all of said members together in a fixed relationship whereby a unitary structure is provided, and field coils positioned on said poles, said field coils and said electrical conductors being encased in said insulating material.

GLENN D. WILLITS.

REFERENCES CITED

The following references are of record in the file of this patent:

UNITED STATES PATENTS

| Number | Name | Date |
| --- | --- | --- |
| 1,858,870 | Apple | May 17, 1932 |
| 1,875,207 | Apple | Aug. 30, 1932 |